(12) United States Patent
Yan et al.

(10) Patent No.: US 11,376,662 B2
(45) Date of Patent: Jul. 5, 2022

(54) METHOD FOR FORMING CENTER LINK OF CONNECTING ROD FOR VARIABLE DISPLACEMENT ENGINE

(71) Applicant: METALDYNE, LLC, Detroit, MI (US)

(72) Inventors: Dejian Yan, Jiangsu (CN); Edwin Wen-Wei Zung, Beverly Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 253 days.

(21) Appl. No.: 16/808,567

(22) Filed: Mar. 4, 2020

(65) Prior Publication Data

US 2020/0353538 A1     Nov. 12, 2020

Related U.S. Application Data

(60) Provisional application No. 62/846,069, filed on May 10, 2019.

(51) Int. Cl.
     *B22F 5/00*         (2006.01)
     *F16C 7/02*         (2006.01)
     (Continued)

(52) U.S. Cl.
     CPC ............... *B22F 5/008* (2013.01); *B22F 3/17* (2013.01); *B22F 3/24* (2013.01); *F16C 7/023* (2013.01); *B22F 2003/247* (2013.01)

(58) Field of Classification Search
     CPC .... B22F 5/008; B22F 3/17; B22F 3/24; B22F 2003/247; F16C 7/023
     See application file for complete search history.

(56) References Cited

U.S. PATENT DOCUMENTS 4,693,139 A * 9/1987 Mukai .................. B23D 31/003
                                                                          29/888.09
5,536,089 A     7/1996 Weber et al.
(Continued)

FOREIGN PATENT DOCUMENTS

| DE | 4232432 A1 | 3/1994 |
|----|------------|--------|
| EP | 0846232 B1 | 6/1998 |
| JP | 2012225165 A | 11/2012 |

OTHER PUBLICATIONS

Gu et al. ("Fracture splitting technology of automobile engine connecting rod." The international journal of advanced manufacturing technology 25.9 (2005): 883-887.) (Year: 2005).*

*Primary Examiner* — Kevin E Yoon
*Assistant Examiner* — Ricardo D Morales
(74) *Attorney, Agent, or Firm* — Burris Law, PLLC

(57) ABSTRACT

A method includes powder forging and machining a workpiece that is fractured to divide the workpiece into separate components. In a green form in which the workpiece is formed of compacted powdered metal and has a body that is generally shaped as a parallelepiped with a pair of end faces. The body defines a bore, a pair of V-notches and a pair of channels. The V-notches are formed into the bore parallel to the central axis of the bore and cooperate to define a separation plane. Each of the channels is formed in an associated one of the end faces at a location where the separation plane intersects the end face. During forging, the channels are closed but create a stress riser that aids in directing the fracture when the components are separated from one another.

19 Claims, 3 Drawing Sheets

(51) Int. Cl.
*B22F 3/17* (2006.01)
*B22F 3/24* (2006.01)

(56) References Cited

U.S. PATENT DOCUMENTS

| | | | | |
|---|---|---|---|---|
| 5,905,939 A | * | 5/1999 | Ishijima | F16C 7/023 419/28 |
| 2002/0144665 A1 | * | 10/2002 | Ushijima | F02B 75/045 123/48 B |
| 2009/0107468 A1 | * | 4/2009 | Takahashi | F02B 75/048 123/48 B |

* cited by examiner

METHOD FOR FORMING CENTER LINK OF CONNECTING ROD FOR VARIABLE DISPLACEMENT ENGINE

CROSS-REFERENCE TO RELATED APPLICATIONS

This application claims the benefit of U.S. Provisional Patent Application No. 62/846,069 filed May 10, 2019, the disclosure of which is incorporated by reference as if fully set forth in detail herein.

FIELD

The present disclosure relates to a method for forming a center link of a connecting rod for a variable displacement engine.

BACKGROUND

This section provides background information related to the present disclosure which is not necessarily prior art.

Fracture-splitting is a relatively common technique employed in the fabrication of connecting rods and components, such as engine blocks and cylinder heads, where a cap is separated from another component. In brief, fracture-splitting is employed on workpieces where the cap and component are unitarily and integrally formed. The process involves the use of a fracturing tool that is inserted into a bore in the workpiece. The fracturing tool is operated to initiate a fracture between the cap and the component that emanates outwardly from the bore. In contrast to assemblies where a cap and a mating component are separately manufactured and assembled, fracture-splitting is advantageous because it is relatively less expensive and the uneven surface of the fracture provide a very precise and stable joint having surfaces with mating peaks and valleys that lock together.

In certain components, the design of the workpiece and/or the material characteristics of the metal from which the workpiece is formed and/or heat treating of the workpiece, causes the fracture to propagate in an undesired manner when the cap is fracture-split from the component. In such situations, it can be necessary to undertake remedial measures, such as machining V-grooves into the exterior surfaces of the workpiece, prior to the fracture-splitting operation. While such remedial measures may be necessary for a particular cap and component, they nevertheless are undesirable in that they tend to increase the cost of the finished article.

SUMMARY

This section provides a general summary of the disclosure, and is not a comprehensive disclosure of its full scope or all of its features.

In one form, the present disclosure provides a method that includes: forming a green workpiece from a powdered metal material, the green workpiece having a body that is generally shaped as a parallelepiped with a peripheral end surface and a pair of end faces that are separated from one another by the peripheral end surface, the body defining a first bore, a second bore, a third bore, a pair of V-notches, and a pair of channels, the first, second and third bores each having a central axis that is perpendicular to the end faces, the central axes of the first, second and third bores being disposed in a common plane such that the second bore is disposed between the first and third bores, the V-notches being formed into the second bore parallel to the central axis of the second bore and cooperating to define a separation plane that is offset from the common plane about the central axis of the second bore by a predetermined offset angle, the predetermined offset angle being an acute dihedral angle between the separation and common planes, wherein a distance between the second bore and the peripheral end surface along the separation plane is greater than a minimum distance between the second bore and the peripheral end surface, each of the channels being formed in an associated one of the end faces at a location where the separation plane intersects the end face; sintering the green workpiece to form a sintered workpiece; forging the sintered workpiece to form a forged workpiece in which the channels are substantially closed; inserting a fracturing tool into the second bore; and driving the fracturing tool apart while the fracturing tool is inserted into the second bore to fracture the forged workpiece along the separation plane into first and second forged components.

In another form, the present teachings provide a method that includes: forming a green workpiece from a powdered metal material, the green workpiece having a body with a peripheral end surface and a pair of end faces that are separated from one another by the peripheral end surface, the body defining a first bore, a second bore, a third bore, a pair of notches, and a pair of channels, the first, second and third bores each having a central axis that is perpendicular to the end faces, the central axes of the first, second and third bores being disposed in a common plane such that the second bore is disposed between the first and third bores, the notches being formed into the second bore parallel to the central axis of the second bore and cooperating to define a separation plane that is offset from the common plane about the central axis of the second bore by a predetermined offset angle, the predetermined offset angle being an acute dihedral angle between the separation and common planes, each of the channels being formed in an associated one of the end faces at a location where the separation plane intersects the end face; sintering the green workpiece to form a sintered workpiece; forging the sintered workpiece to form a forged workpiece in which the channels are at least substantially closed; inserting a fracturing tool into the second bore; and driving the fracturing tool apart while the fracturing tool is inserted into the second bore to fracture the forged workpiece along the separation plane into first and second forged components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure relates to the formation of an article from a powdered metal material. The powdered metal material is compacted in a die to form a green workpiece, the green workpiece is sintered to form a sintered workpiece, the sintered workpiece is forged to form a forged workpiece, the forged workpiece is machined and the machined forged workpiece is thereafter fractured along a separation plane to form components of the article that are capable of being assembled together.

Figure 1:
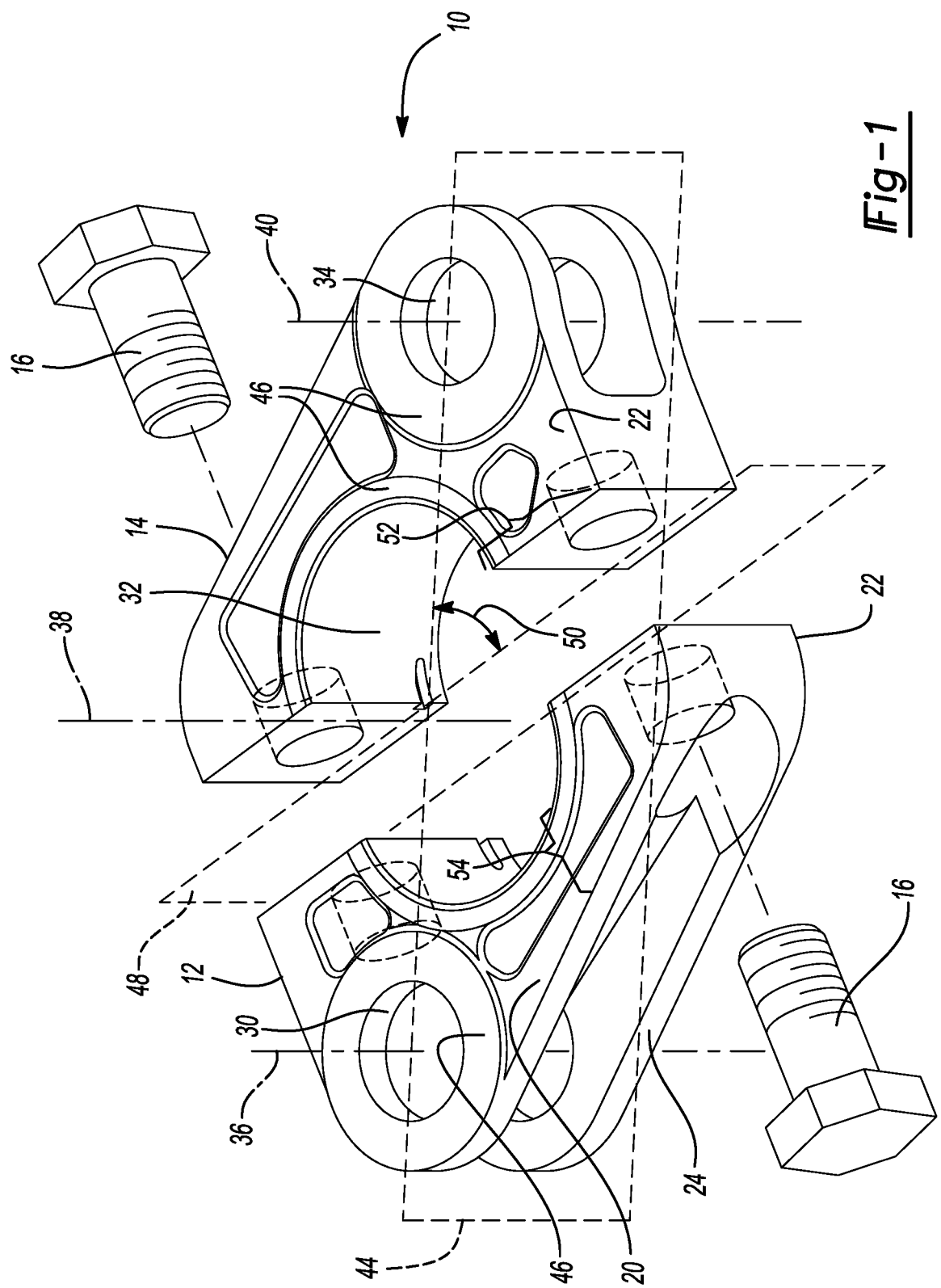
FIG. 1 is an exploded perspective view of an exemplary article constructed in accordance with the teachings of the present disclosure.

With reference to FIG. 1, an exemplary (finished) article constructed in accordance with the teachings of the present disclosure is generally indicated by reference numeral 10. The article 10 has first and second components 12 and 14 that are fastened together with a pair of bolts 16. In the example provided, the article 10 is a center link for a variable stroke connecting rod, but it will be appreciated that the article 10 could be configured differently. For example, the (finished) article could be a (fixed stroke) connecting rod for an engine. The article 10 has a body 20 that is generally parallelepiped shaped and having a pair of opposite axial end faces 22 that are separated from one another by a peripheral edge 24. The body 20 defines a first bore 30, a second bore 32 and a third bore 34, each of which having a central axes 36, 38 and 40, respectively, that are generally perpendicular to and extend through the end faces 22. The central axes 36, 38 and 40 are arranged in a common plane 44 so that the second bore 32 is disposed between the first and third bores 30 and 34. An annular thrust face 46 is disposed about each of the first, second and third bores 30, 32 and 34 on each of the end faces 22. Each annular thrust face 46 is a relatively flat area adjacent to an associated one of the first, second and third bores 30, 32 and 34. The annular thrust faces 46 on a given one of the end faces 22 can be disposed in one or more planes that can be disposed generally parallel to the end faces 22 and perpendicular to the central axes 36, 38 and 40. The first and second components 12 and 14 are separated from one another (i.e., fractured) along a separation plane 48. The separation plane 48 is offset from the common plane 44 about the central axis 38 of the second bore 32 by a predetermined offset angle 50. The predetermined offset angle 50 is an acute dihedral angle between the separation plane 48 and the common plane 44. A first distance 52 between the second bore 32 and the peripheral edge 24 along the separation plane 48 is greater than a second or minimum distance 54 between the second bore 32 and the peripheral edge 24. The article 10 is initially formed of compacted powdered metal, and is thereafter sintered, forged and machined prior to the separation of the first and second components 12 and 14 via a fracturing operation.

Figure 2:
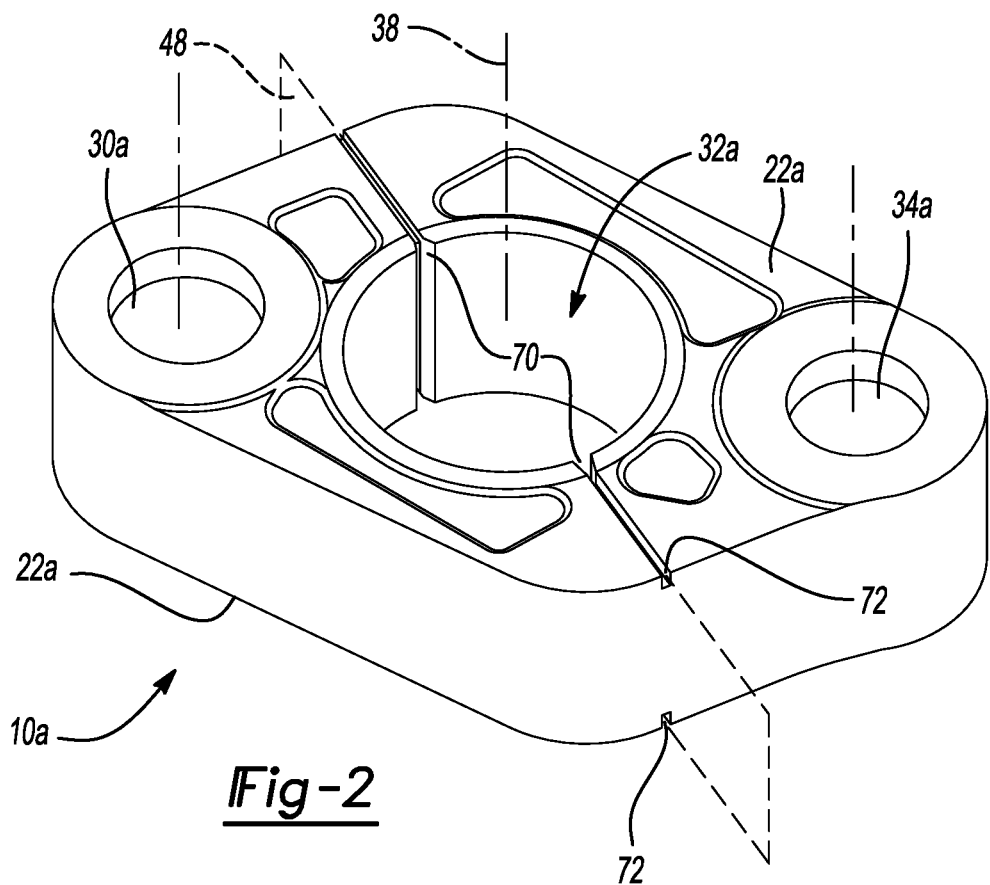
FIG. 2 is a perspective view of a green workpiece formed of compacted powdered metal constructed in accordance with the teachings of the present disclosure.

In FIG. 2, the green workpiece is generally indicated by reference numeral 10a. The green workpiece 10a is formed of a suitable powdered metal material, such as HS250, HS200 or HS170, for example, that has been compacted in a die (not shown) and is generally similar in shape to the article 10 of FIG. 1 except for the sizing of certain features and the provision of a pair of V-notches 70 and a pair of channels 72. The V-notches 70 are formed into the second bore 32a parallel to the central axis 38 of the second bore 32a and cooperate to define the separation plane 48. Each of the channels 72 is formed in an associated one of the end faces 22a. Regarding the sizing of the various features on the green workpiece 10a, internal features such as the first, second and third bores 30a, 32a and 34a, respectively, can be sized somewhat smaller than the first, second and third bores 30, 32 and 34 (FIG. 1) in the article 10 (FIG. 1), while various external features, such as the thickness of the green workpiece 10a can be somewhat thicker than the thickness of the article 10 (FIG. 1). Each of the channels 72 is formed in an associated one of the end faces 22a and is disposed along a path where the separation plane 48 intersects the associated one of the end faces 22a. The channels 72 can be relatively small in size, having a width and a depth that are less than or equal to 3 mm and preferably less than or equal to 2 mm. The channels 72 can extend in a continuous manner fully across the end faces 22a, or could extend in an intermittent manner across the end faces 22a. In the example provided, each of the channels 72 has a square or rectangular lateral cross-sectional shape having a flat bottom surface and opposite sidewalls that are perpendicular to the bottom surface. It will be appreciated, however, that the lateral cross-sectional shape of one or both of the channels 72 could be somewhat different from what is shown here. For example, the lateral cross-sectional shape of one or both of the channels 72 could be defined in part or in whole by a radius. As another example, the lateral cross-sectional shape of one or both of the channels 72 could have a generally V-shaped bottom surface.

The green workpiece 10a is sintered to permanently fuse the powdered metal. Thereafter, the sintered workpiece is processed in a hot forging operation so that the forged workpiece has full density. During the hot forging operation, the channels 72 in the end faces 22a are at least substantially closed (i.e., material adjacent to the channel 72 is compacted and/or driven into the space defined by the channel 72). Optionally, the V-notches 70 can be closed or substantially closed during the hot forging operation.

Figure 3:
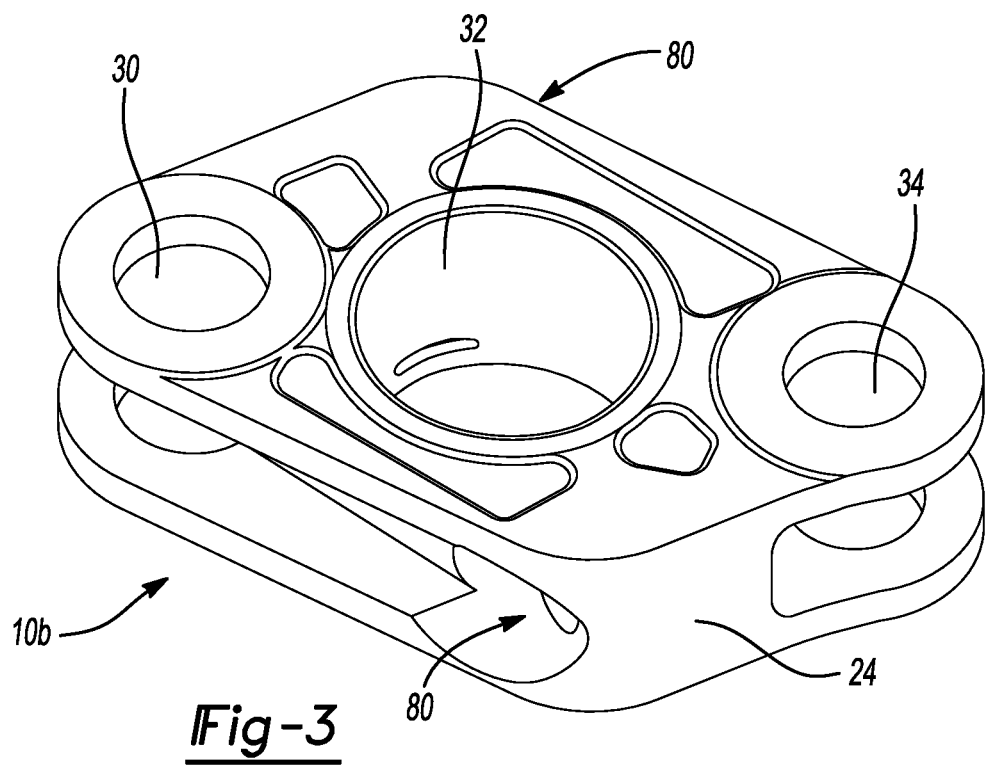
FIG. 3 is a perspective view of a sintered, forged and machined workpiece constructed in accordance with the teachings of the present disclosure.

In FIG. 3, the forged workpiece 10b is thereafter machined as desired. For example, the first, second and third bores 30, 32 and 34 can be machined to final size, as can other features, such as the thickness of the forged workpiece. Additionally, bolt holes 80 can be formed (e.g., drilled and tapped) in the forged workpiece 10b. The bolt holes 80 can be formed into the peripheral edge 24 and can be disposed perpendicular to the separation plane 48 (FIG. 1).

Figure 4:
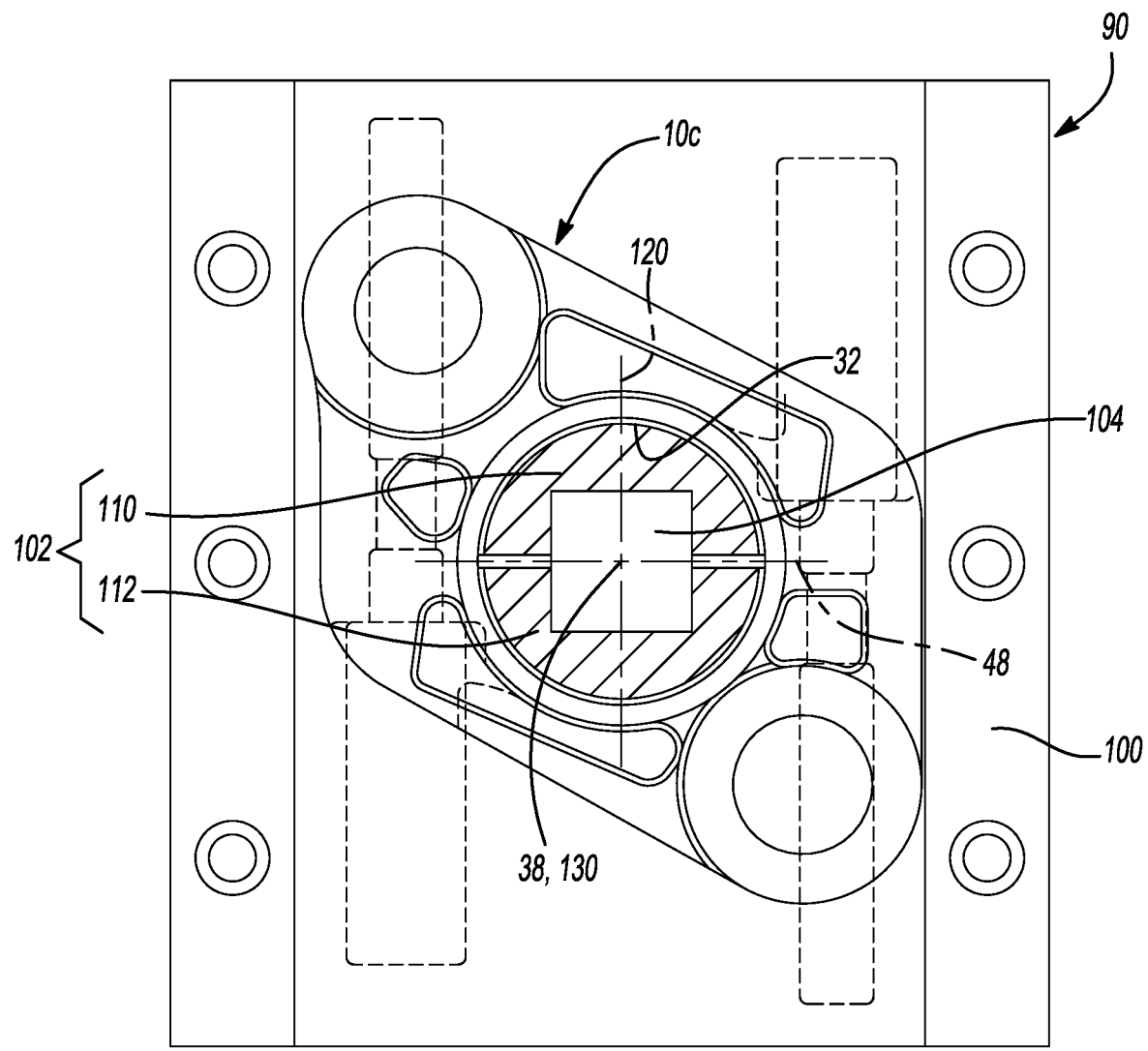
FIG. 4 is a schematic illustration of the sintered, forged and machined workpiece mounted in a fixture that is configured to perform a fracturing operation to separate the workpiece into first and second components.

With reference to FIG. 4, the machined forged workpiece 10c can be processed in a fracturing machine 90 having fixture portion 100, a mandrel 102 and a wedge 104. The fixture portion 100 is configured, either by itself or in conjunction with the mandrel 102, to orient the machined forged workpiece 10c such that the separation plane 48 is disposed in a predetermined orientation. The mandrel 102 includes first and second mandrel portions 110 and 112, respectively, that are shaped as horizontal cylindrical segments that are sized to the diameter of the second bore 32. The first and second mandrel portions 110 and 112 can be symmetrically disposed about the separation plane 48 and matingly received in the second bore 32. One of the first and second mandrel portions 110 and 112 can be maintained in a stationary, fixed condition (e.g., fixedly mounted to the fixture portion 100), while the other one of the first and second mandrel portions 110 and 112 can be movable relative to the stationary one of the first and second mandrel portions 110 and 112 about a reaction axis 120 that is perpendicular to the central axis 38 of the second bore 32.

The wedge 104 is received between the first and second mandrel portions 110 and 112 and is movable along a wedge translation axis 130 that is parallel to (e.g., coincident with) the central axis 38 of the second bore 32.

With a machined forged workpiece 10c positioned in the fixture portion 100 and disposed over the mandrel 102, the wedge 104 can be translated into the first and second mandrel portions 110 and 112 to drive the movable one of the first and second mandrel portions 110 and 112 away from the other one of the first and second mandrel portions 110 and 112 to initiate a fracture in the machined forged workpiece 10c that will separate the first and second components 12 and 14 from one another. In this regard, stress risers created by the presence of the at least substantially closed V-notches 70 (FIG. 2) in the second bore 32 and the at least substantially closed channels 72 (FIG. 2) in the green workpiece 10a (FIG. 2) effectively guide the fracture between the first and second components 12 and 14 such that it nominally occurs along the separation plane 48.

With renewed reference to FIG. 1, the first and second components 12 and 14 can be engaged to one another subsequent to the fracturing operation and bolts 16 can be employed to secure the first and second components 12 and 14 to one another. If desired, further machining operations, such as finish sizing one or more of the first, second and third bores 30, 32 and 34, and/or adding tang slots (not specifically shown) for bearing shells into the first and second components 12 and 14. It will be appreciated, however, that that all machining required for forming the article 10 could be performed subsequent to the hot forging operation and prior to the fracturing operation.

From the foregoing discussion those of ordinary skill in the art will appreciate that the teachings of the present disclosure can be employed to form (finished) articles having a geometry that includes a bore across which a fracture extends but which is otherwise shaped differently than the article 10. In this regard, a green workpiece can be formed from a powdered metal material and can define a bore that intersects a pair of end faces, a pair of V-notches, which are formed into the bore parallel to a central axis of the bore and cooperate to define a separation plane, and a pair of channels that are each formed in an associated one of the end faces at a location where the separation plane intersects an associated one of the end faces; the green workpiece can be sintered to form a sintered workpiece; the sintered workpiece and be forged to form a forged workpiece in which the channels are substantially closed; a fracturing tool can be inserted into the bore; and the fracturing tool can be driven apart while it is inserted into the bore to fracture the forged workpiece along the separation plane into first and second forged components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
    forming a green workpiece from a powdered metal material, the green workpiece having a body that is generally shaped as a parallelepiped with a peripheral end surface and a pair of end faces that are separated from one another by the peripheral end surface, the body defining a first bore, a second bore, a third bore, a pair of V-notches, and a pair of channels, the first, second and third bores each having a central axis that is perpendicular to the end faces, the central axes of the first, second and third bores being disposed in a common plane such that the second bore is disposed between the first and third bores, the V-notches being formed into the second bore parallel to the central axis of the second bore and cooperating to define a separation plane that is offset from the common plane about the central axis of the second bore by a predetermined offset angle, the predetermined offset angle being an acute dihedral angle between the separation plane and the common plane, wherein a distance between the second bore and the peripheral end surface along the separation plane is greater than a minimum distance between the second bore and the peripheral end surface, each of the channels being formed in an associated one of the end faces at a location where the separation plane intersects the end face;
    sintering the green workpiece to form a sintered workpiece;
    forging the sintered workpiece to form a forged workpiece in which the channels are at least substantially closed; and
    inserting a fracturing tool into the second bore; and
    driving the fracturing tool apart while the fracturing tool is inserted into the second bore to fracture the forged workpiece along the separation plane into first and second forged components.

2. The method of claim 1, wherein the channels in the green workpiece have a depth and a width that are each less than or equal to 3 mm.

3. The method of claim 2, wherein the depth and the width are each less than or equal to 2 mm.

4. The method of claim 1, wherein prior to inserting the fracturing tool into the second bore, the method further comprises machining the forged workpiece.

5. The method of claim 4, wherein machining the forged workpiece comprises sizing the first bore to a predetermined first diameter, sizing the second bore to a predetermined second diameter and sizing the third bore to a predetermined third diameter.

6. The method of claim 4, wherein machining the forged workpiece comprises tapping a pair of holes, each of the holes being formed perpendicular to the separation plane.

7. The method of claim 1, wherein the body of the green workpiece defines a pair of annular thrust faces, each of the annular thrust faces being disposed on an associated one of the end faces, and wherein each of the channels has a pair of channel portions, each of the channel portions extending between an associated one of the V-notches and the peripheral end surface.

8. The method of claim 1, wherein at least one of the channels is formed with a flat bottom.

9. The method of claim 8, wherein the at least one of the channels is formed with a rectangular or square lateral cross-sectional shape.

10. A method comprising:
    forming a green workpiece from a powdered metal material, the green workpiece having a body with a peripheral end surface and a pair of end faces that are separated from one another by the peripheral end surface, the body defining a first bore, a second bore, a third bore, a pair of notches, and a pair of channels, the first, second and third bores each having a central axis that is perpendicular to the end faces, the central axes of the first, second and third bores being disposed in a common plane such that the second bore is disposed between the first and third bores, the notches being formed into the second bore parallel to the central axis of the second bore and cooperating to define a separation plane that is offset from the common plane about the central axis of the second bore by a predetermined offset angle, the predetermined offset angle being an acute dihedral angle between the separation plane and the common plane, each of the channels being formed in an associated one of the end faces at a location where the separation plane intersects the end face;

sintering the green workpiece to form a sintered workpiece;

forging the sintered workpiece to form a forged workpiece in which the channels are at least substantially closed; and inserting a fracturing tool into the second bore; and driving the fracturing tool apart while the fracturing tool is inserted into the second bore to fracture the forged workpiece along the separation plane into first and second forged components.

11. The method of claim 10, wherein a distance between the second bore and the peripheral end surface along the separation plane is greater than a minimum distance between the second bore and the peripheral end surface.

12. The method of claim 10, wherein at least one of the channels is formed with a flat bottom.

13. The method of claim 12, wherein the at least one of the channels is formed with a rectangular or square lateral cross-sectional shape.

14. The method of claim 10, wherein the channels in the green workpiece have a depth and a width that are each less than or equal to 3 mm.

15. The method of claim 14, wherein the depth and the width are each less than or equal to 2 mm.

16. The method of claim 10, wherein prior to inserting the fracturing tool into the second bore, the method further comprises machining the forged workpiece.

17. The method of claim 16, wherein machining the forged workpiece comprises sizing the first bore to a predetermined first diameter, sizing the second bore to a predetermined second diameter and sizing the third bore to a predetermined third diameter.

18. The method of claim 16, wherein machining the forged workpiece comprises tapping a pair of holes, each of the holes being formed perpendicular to the separation plane.

19. The method of claim 10, wherein the body of the green workpiece defines a pair of annular thrust faces, each of the annular thrust faces being disposed on an associated one of the end faces, and wherein each of the channels has a pair of channel portions, each of the channel portions extending between an associated one of the notches and the peripheral end surface.

* * * * *